Jan. 25, 1955 R. L. ELLER 2,700,232

TAIL GATE MOUNTING FOR CARRY-TYPE SCOOPS

Filed Jan. 22, 1949 8 Sheets-Sheet 1

INVENTOR.
Robert L. Eller
BY
Smith & Wells
ATTORNEYS

Jan. 25, 1955 R. L. ELLER 2,700,232

TAIL GATE MOUNTING FOR CARRY-TYPE SCOOPS

Filed Jan. 22, 1949 8 Sheets-Sheet 2

INVENTOR.
Robert L. Eller.
BY
Smith & Wells
ATTORNEYS

Jan. 25, 1955 R. L. ELLER 2,700,232

TAIL GATE MOUNTING FOR CARRY-TYPE SCOOPS

Filed Jan. 22, 1949 8 Sheets-Sheet 3

INVENTOR.
Robert L. Eller
BY
Smith & Wells
ATTORNEYS

Jan. 25, 1955 R. L. ELLER 2,700,232

TAIL GATE MOUNTING FOR CARRY-TYPE SCOOPS

Filed Jan. 22, 1949 8 Sheets-Sheet 4

INVENTOR.
Robert L. Eller
BY
Smith & Wells
ATTORNEYS

TAIL GATE MOUNTING FOR CARRY-TYPE SCOOPS

Filed Jan. 22, 1949 8 Sheets-Sheet 5

INVENTOR.

Robert L. Eller

BY

Smith & Wells

ATTORNEYS

Jan. 25, 1955 R. L. ELLER 2,700,232

TAIL GATE MOUNTING FOR CARRY-TYPE SCOOPS

Filed Jan. 22, 1949 8 Sheets-Sheet 6

INVENTOR.

Robert L. Eller

BY

Smith & Wells

ATTORNEYS

Jan. 25, 1955 R. L. ELLER 2,700,232

TAIL GATE MOUNTING FOR CARRY-TYPE SCOOPS

Filed Jan. 22, 1949 8 Sheets-Sheet 7

INVENTOR.
Robert L. Eller
BY
Smith & Wells
ATTORNEYS

Jan. 25, 1955 R. L. ELLER 2,700,232

TAIL GATE MOUNTING FOR CARRY-TYPE SCOOPS

Filed Jan. 22, 1949 8 Sheets-Sheet 8

INVENTOR.

Robert L. Eller

BY

Smith & Wells

ATTORNEYS

United States Patent Office 2,700,232

Patented Jan. 25, 1955

2,700,232

TAIL GATE MOUNTING FOR CARRY-TYPE SCOOPS

Robert L. Eller, Spokane, Wash., assignor to Westfall Equipment Company, Portland, Oreg., a corporation of Oregon Application January 22, 1949, Serial No. 72,148

1 Claim. (Cl. 37—126)

The present invention relates to improvements in tail gate mounting for carry-type scoop.

It is the principal purpose of my invention to provide an improved construction for earth moving equipment embodying a bowl, a scraper, a front apron and a rear gate for loading and unloading loose materials such as earth, gravel, coal and the like, with a novel supporting structure whereby the loading and unloading of the bowl and the maneuvering thereof may be done in a most efficient fashion.

More specifically my invention contemplates a self powered device of this character where each supporting wheel is individually powered and the bowl itself with its front apron and rear gate have separate individual controls, all operable from a common source of power supply carried on the device.

It is a further purpose of my invention to provide a novel frame construction for supporting a loading, transporting and dumping bowl wherein the several parts of the bowl operating mechanism and the control and power supply means are carried within the frame.

It is a further purpose of my invention to provide, in earth moving equipment of the character described, a novel bowl and rear gate mounting adapted to relieve the rear gate at its opening movements from the pressure of the load in the bowl in a novel fashion.

It is also a purpose of my invention to provide in earth moving equipment a novel bowl construction and mounting whereby the bowl itself is freely movable between a scraping position, a transporting position and a spreading position or dumping position without affecting the position of the rear gate with respect to the bowl.

It is also a purpose of my invention to provide a novel frame and front pedestal combination in a device of the character described whereby the frame may be raised and lowered on the pedestal.

My invention contemplates a combination self-loading and transporting scoop wherein a substantially U-shaped frame is supported near its rear end on powered wheels and at its front end, where the legs of the U-shaped frame join each other, by a pedestal adjustable in height and supported by individually powered wheels, the lower end of the pedestal to which the wheels are connected, being rotatable for steering purposes. The bowl is pivoted to the legs of the U-shaped frame and suspended below the frame, the entire area of the frame over the bowl being outside the confines of the bowl whereby the bowl may be loaded from above without interference from supporting or frame members.

Other objects and advantages of my invention will appear from the following description and the accompanying drawings illustrating a preferred form of the invention. It should be understood however, that the drawings and description are illustrative only and should not be considered as limiting the invention except insofar as it is limited by the claim.

Figures 1, 5:
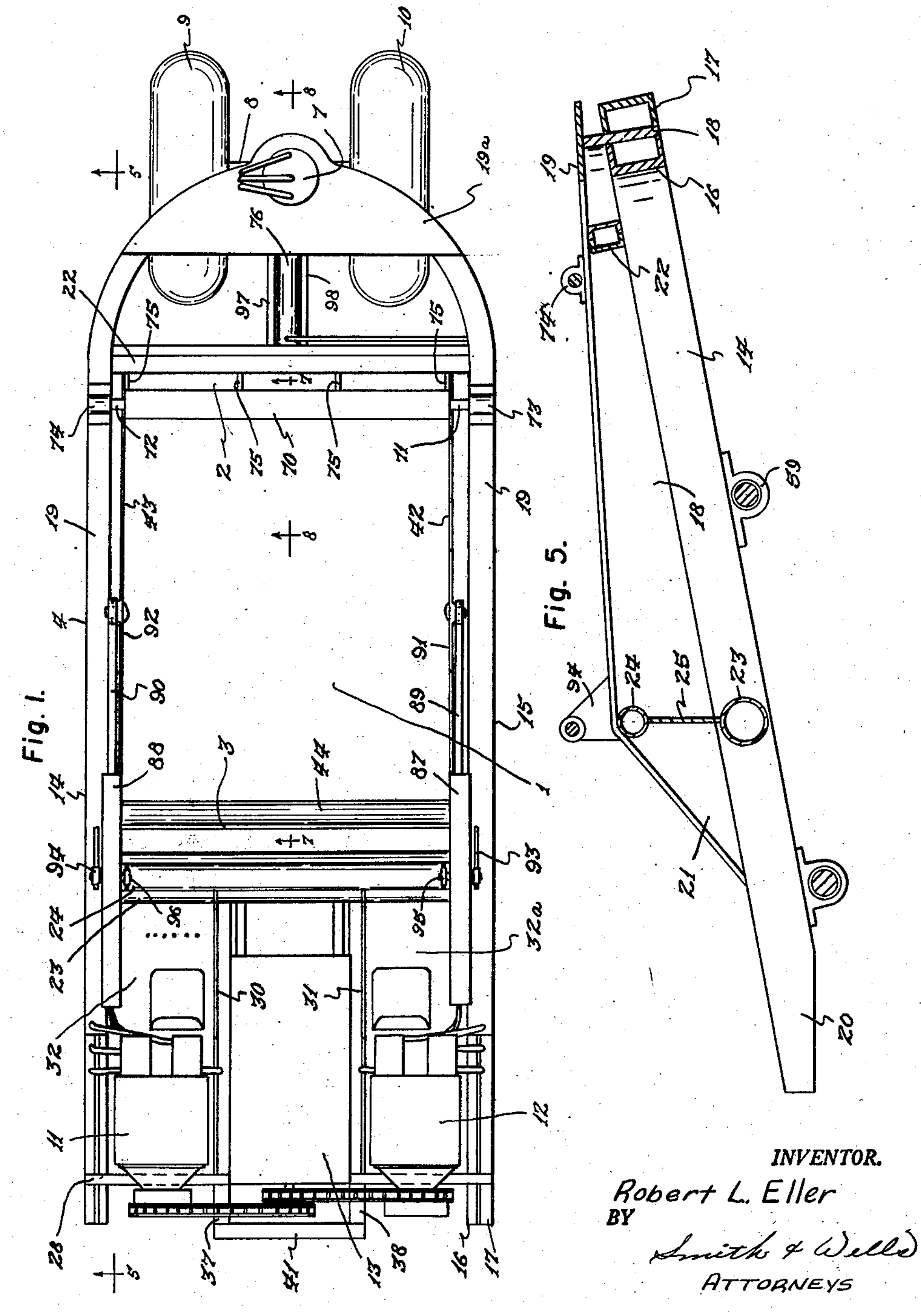
Figure 1 is a plan view of a machine embodying my invention.
Figure 5 is a fragmentary sectional view taken on the line 5—5 of Figure 1, and illustrating the frame construction only, all other parts being left out for sake of clearness.

Referring now to the drawings and in particular to Figures 1 to 4, my improved machine is provided with a bowl 1, having associated therewith a front apron 2 and a tail gate 3. The bowl is pivotally suspended from a main frame 4. The main frame 4 is supported at its rear end by wheels 5 and 6. The front end of the main frame 4 is supported by a pedestal 7 which is adjustable in height. This pedestal 7 is in turn supported by an axle 8. Two front wheels 9 and 10 support the axle 8. The four wheels 5, 6, 9 and 10 have hydraulic motors in the hubs thereof to furnish the power necessary for moving the machine. The details of the motors are not shown herein since they may be of any known type such as that manufactured by the Oil Gear Company, of Milwaukee, Wisconsin.

Fluid at the requisite pressures for operating the several motors is obtained from two pumps 11 and 12 which are driven by an engine 13.

*Frame construction*

The construction of the main frame 4 is illustrated best by Figures 1, 2, 5 and 6. The main frame is substantially U-shaped and is composed of two side portions 14 and 15 which are substantially identical in construction except that one is a right hand half and the other is a left hand half of the main frame. Each section is made up of two steel channels 16 and 17 with a steel plate 18 between them. The channels 16 and 17 have their flanges facing each other and welded to the plate 18, the lower edges of the channels being flush with the lower edge of the plate 18. The channels 16 and 17 and the plate 18 are curved at their forward ends through substantially a quarter circle and are joined by welding to the pedestal 7. Steel strips 19 are laid on top of the plates 18 and are welded thereto. At the front end a deck plate 19*a* replaces the strips 19 and is welded to the plates 18 and to the tubular pedestal 7. It will be noted from Figures 2 and 5 that the plates 18 vary in height from front to back. The angle between the tops of the plates 18 and the tops of the channels 16 and 17 is such as to give increasing depth of the plate toward the free ends of the channels at the rear of the machine. In normal road traveling position the channels 16 and 17 slope downwardly to the rear at an angle of about 10 degrees to the horizontal. The lower edges of the channels are cut off, as indicated at 20, at the rear end of the machine so that the bottom edges of the channels are substantially horizontal to the wheels 5 and 6. The plates 18 extend to the rear ends of the channels 16 and 17 but are flush with the top edges thereof forwardly to a point substantially over the wheels. Beyond this point toward the forward end of the machine, the plates 18 rise abruptly as indicated at 21 to provide a deep truss substantially directly in line with the greatest thrust force when the bowl 1 is being forced into the ground in loading it.

At the point where the side portions 14 and 15 start to curve toward each other a cross connection is made by a rectangular hollow truss 22. This truss preferably is constructed by placing two steel channels with their flanges in abutment directly on the inner channels 16 and welding the two channels to the plates 18 as well as to the inner channels 16. At approximately the point of greatest depth of the plates 18, the inner channels 16 are connected together by a tubular cross tie 23 which desirably may be a steel pipe of substantially the same diameter as the width of the channels. This steel pipe is welded to the plates 18 by cutting through the channels 16. The webs and flanges of the channels 16 are also welded to the tubular member 23. A second tubular cross tie 24 connects the plates 18 of the side portions 14 and 15 directly beneath the top strips 19 and in vertical alignment with the cross tie 23. A web 25 of steel plate is welded to and connects the cross tie members 23 and 24.

The rear portion of the framework back of the plate 25 serves to support the pumps 11 and 12 and the engine 13. See Figures 1, 2 and 4. In order to form this support I provide two uprights of angle iron at 26 and 27. These upright mount a cross member 28 which preferably is an I-beam. A floor plate 29 is secured at its forward end to the plate 25 and extends to the I-beam 28. There are two of the floor plates 29 and they form the supports for the pumps 11 and 12. They terminate short of the engine 13. Partition walls 30 and 31 are provided forwardly of the pumps 11 and 12 to define two seating areas at 32 and 32*a* for the operator of the machine.

The walls 30 and 31 comprise steel plates which are extended rearward to the I-beam 28. As shown, the plates 30 and 31 are connected, by welding, to a cross beam 33. The plates 30 and 31 are welded to the plate 25, the member 23 and the member 24 at their forward ends and are braced along their bottom edges by steel channels 34. Brackets 35 and 36 are secured to the axles of the wheels 5 and 6 and are mounted on channels 37 and 38 which together with spacing bars 39 and 40 provide the necessary spacing below the channels 34. The channels 37 and 38 and the spacing bars 39 and 40 are of course, welded in place to provide a rigid supporting structure connecting the plates 30 and 31 and the cross beam 33. A rear bumper 41 connects the rear ends of the channels 37 and 38.

*Bowl gate and apron assembly*

Figure 16:
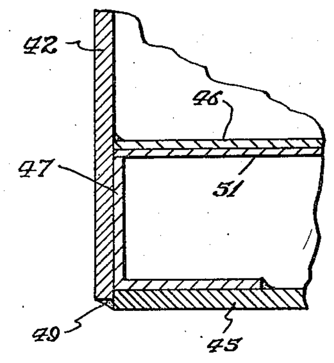
Figure 16 is an enlarged detailed sectional view showing the corner between the bottom and the side of the bowl, the section being taken substantially on the line 16—16 of Figure 7; and, Figure 17 is an enlarged detailed sectional view showing the scraper blade at the front end of the bowl.
Figure 17:
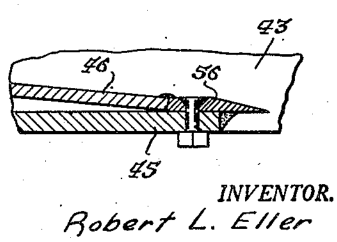
Figure 7:
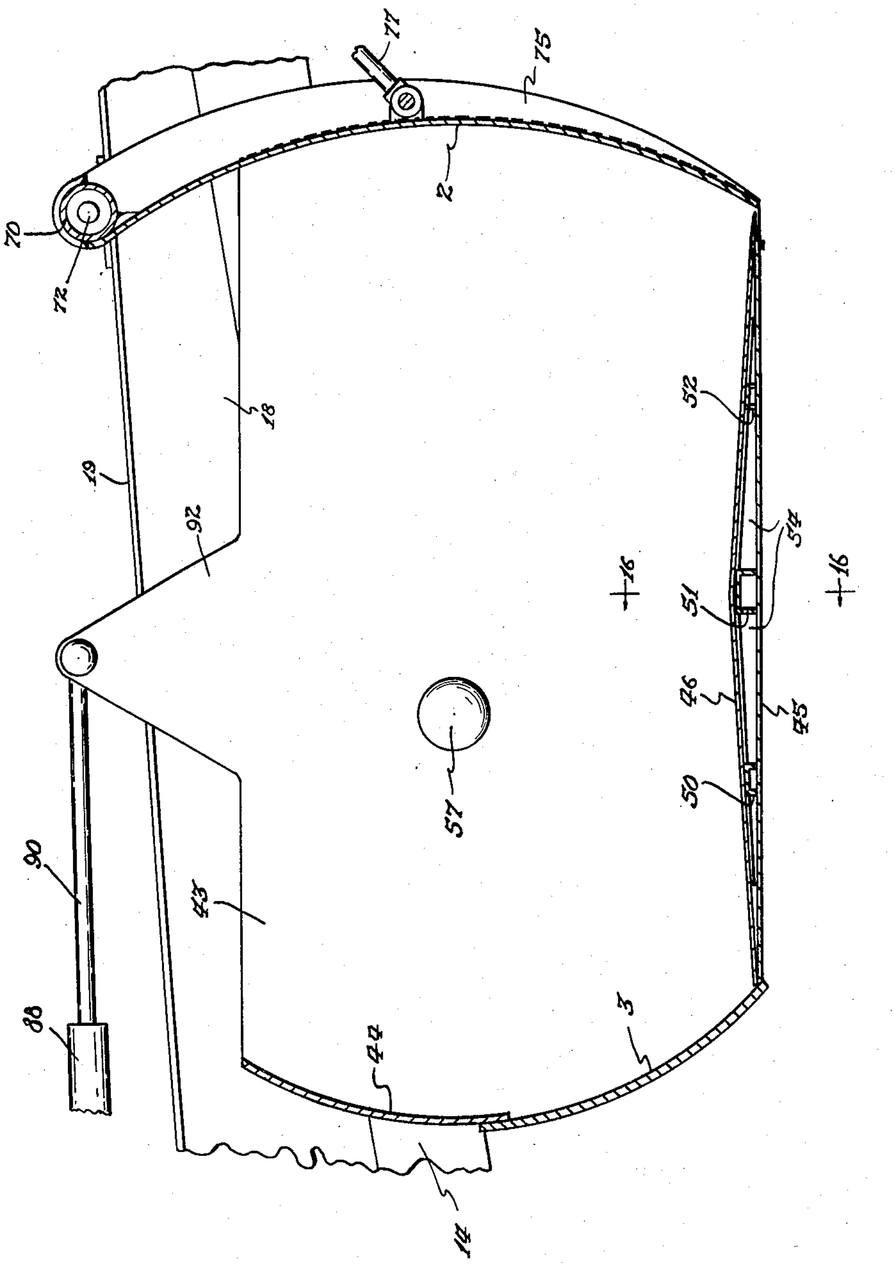
Figure 7 is an enlarged sectional view taken on the line 7—7 of Figure 1.

The details of the bowl, its tail gate and the front apron are illustrated best in Figures 2, 6, 7 and 15. The bowl is made up of two side plates 42 and 43 and a rear wall 44. The wall 44 is curved about the pivotal axis of the bowl as a center. The bowl bottom is made up of a bottom plate 45 and a top plate 46 which is bent at its center to taper downwardly toward the bottom plate 45 from the center toward the front and rear ends of the bowl. The manner of connecting the plates 45 and 46 to the side plates 42 and 43 is illustrated in Figure 16. Angle irons 47 and 48, which have vertical flanges cut to the proper taper, are welded to the side plates 42 and 43 and the bottom plate 45 is welded to the angle irons. The overlapped corners of the side plates 42 and 43 and the bottom plate 45 are welded together as indicated at 49. Channel members 50, 51 and 52 extend from the side plate 42 to the side plate 43 and are interposed between the plates 45 and 46 and welded thereto to give additional rigidity to the load carrying bottom. Between the channels 50, 51 and 52 I also provide transversely spaced channels 53, 54 and 55 (see Figure 6). These channels have their flanges tapered as illustrated by Figure 7, and are welded to the plates 45 and 46. At the forward end of the bowl, the bottom plate 45 projects beyond the top plate 46 (see Figure 17) to provide a mounting for a scraper blade 56.

The bowl is open, between the side plates 42 and 43, entirely across its front face. It is also open at the back from the back wall 44 to the bottom plates 45 and 46. The front and rear edges of the side plates 42 and 43 are curved about an axis at the center of the pivotal support of the bowl. The bowl is provided with two stub shafts 57 and 58 which are journaled in bearings 59 and 60 that are mounted on the bottom faces of the side frames 14 and 15. The bearings 59 and 60 are located substantially midway between the front and rear wheels but preferably slightly to the rear of the mid point.

Figure 2:
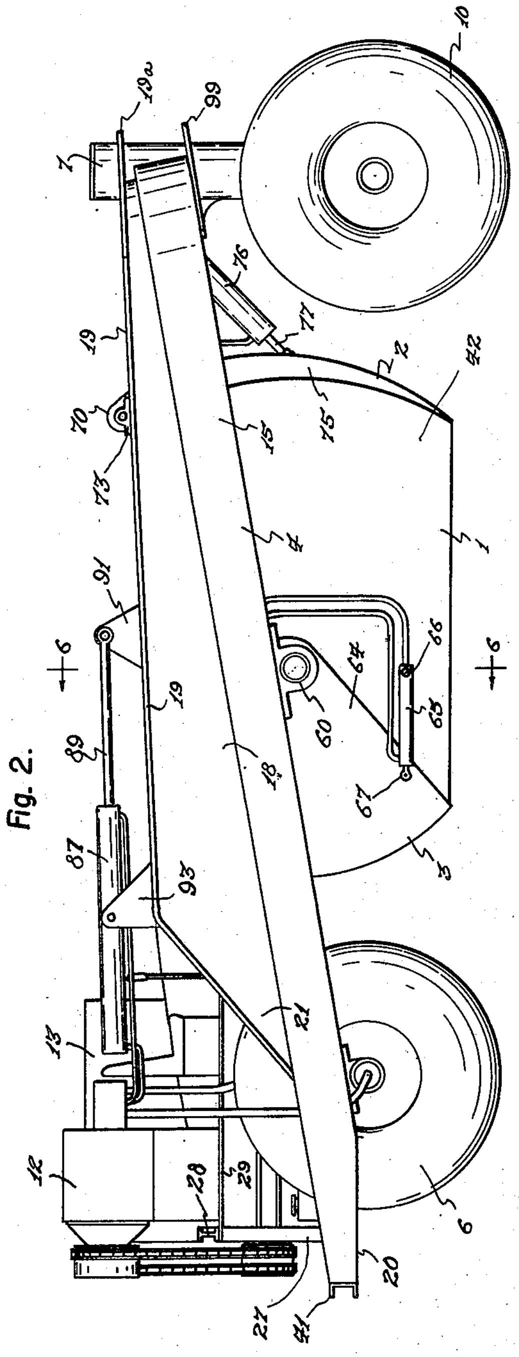
Figure 2 is a view in side elevation of the machine.
Figure 15:
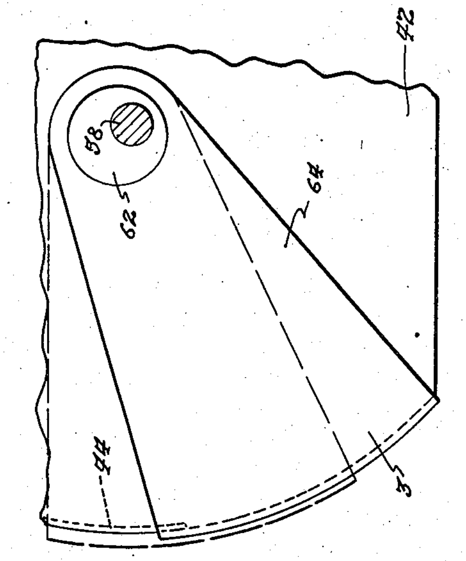
Figure 15 is a fragmentary sectional view taken on the line 15—15 of Figure 6 and illustrating the mounting of the rear gate on the bowl.

Each of the stub shafts 57 and 58 includes an eccentric portion. These eccentric portions are indicated at 61 and 62 in the drawings. They provide bearings for pivotally mounting the tail gate 3 on the bowl 1. The tail gate 3 is curved to match the curvature of the rear wall 44 of the bowl 1 and in closed position overlaps the wall 44, and its lower edge overlaps the bottom plates 45 and 46 of the bowl 1. The tail gate 3 has two side portions 63 and 64 that extend forwardly outside of the side plates 42 and 43 of the bowl 1 and are pivotally mounted on the eccentrics 61 and 62. The shape of the eccentrics 61 and 62 is such that as the tail gate is swung upwardly from closed position, it is backed away from the rear edges of the plates 42 and 43 and away from the rear wall 44 of the bowl. This is illustrated most clearly in Figure 15 of the drawings. Lifting of the tail gate 3 is accomplished in the following manner. An hydraulic cylinder 65 is pivoted at 66 on the side plate 42. The piston of the cylinder has its piston rod 67 pivoted on the tail gate 3 as shown in Figure 2 of the drawings. A like cylinder 68 is provided on the side plate 43 and has its piston pivoted to the tail gate in the same fashion. The two cylinders are operated together to raise and lower the tail gate 3.

Figure 8:
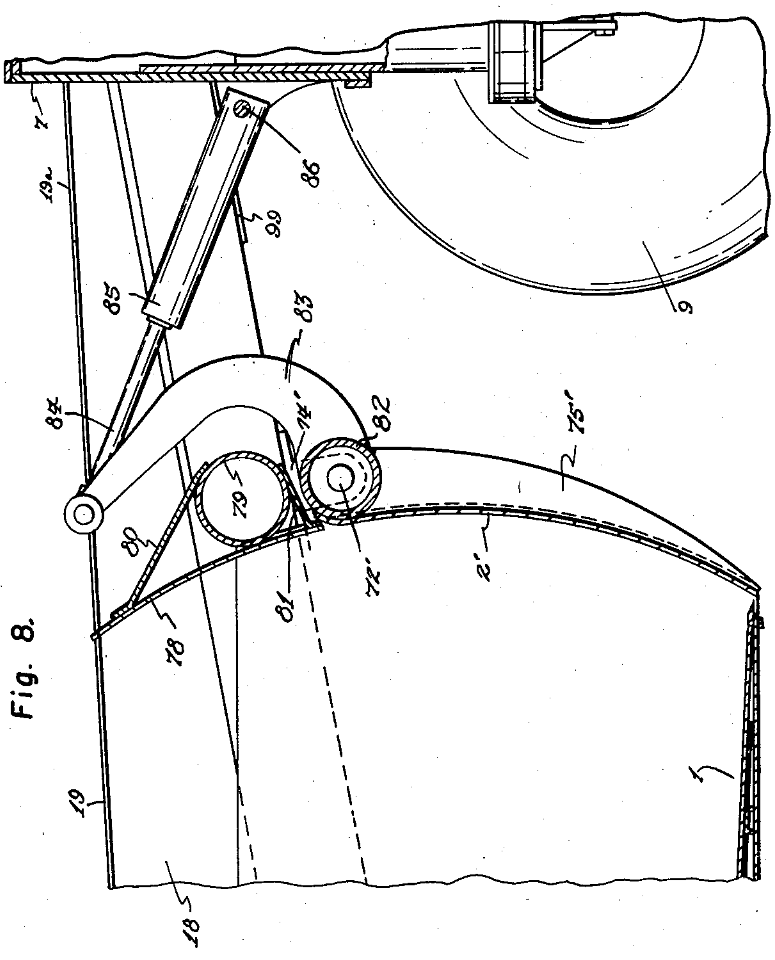
Figure 8 is an enlarged sectional view taken substantially on the line 8—8 of Figure 1 showing a modified apron construction.
Figure 9:
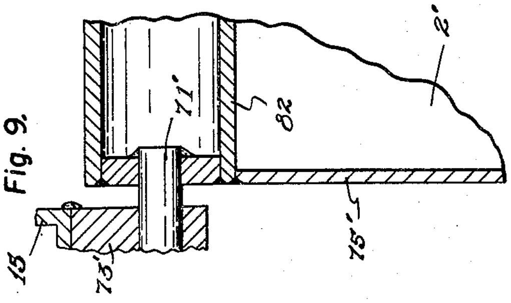
Figure 9 is an enlarged fragmentary detailed sectional view illustrating the pivotal mounting construction for the front apron of Figure 8.
Figure 10:
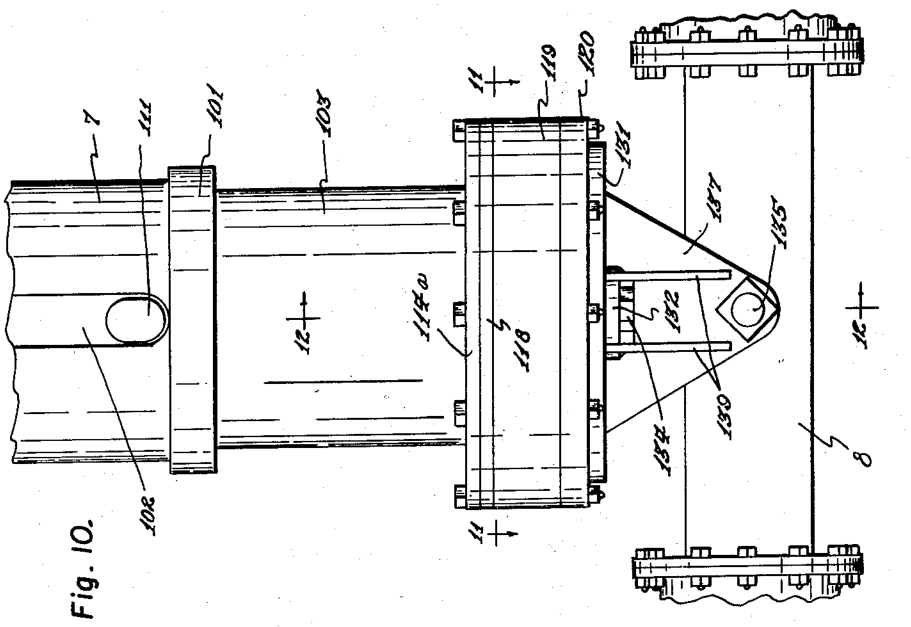
Figure 10 is an enlarged fragmentary front view of the lower portion of the front pedestal of the machine.
Figure 11:
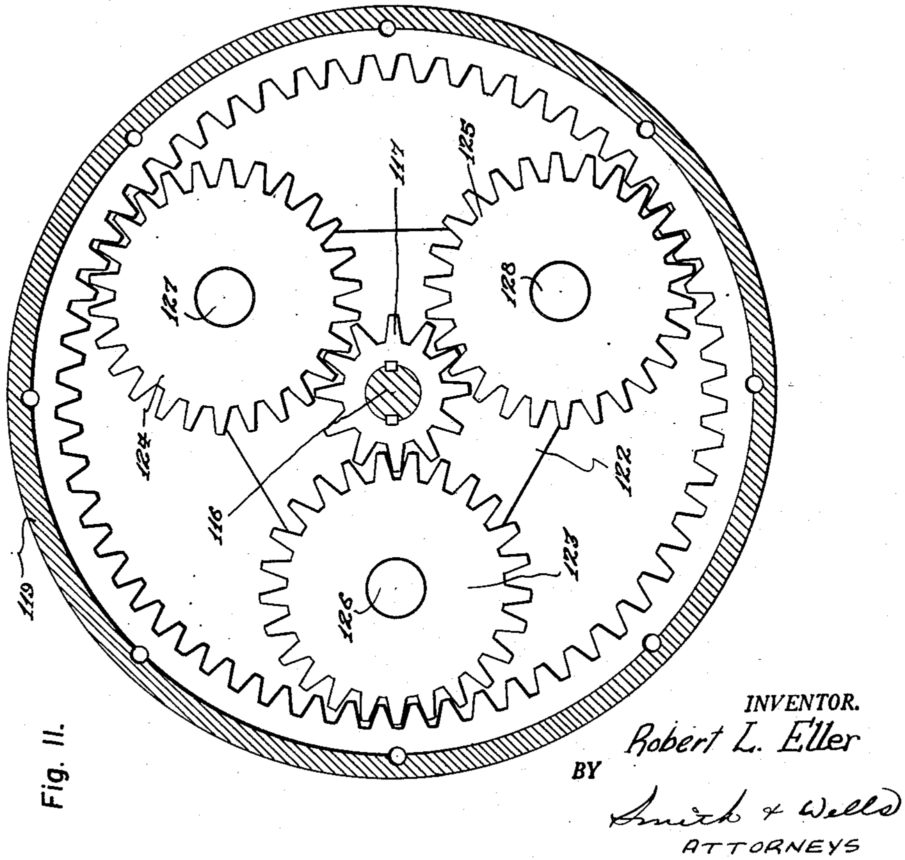
Figure 11 is an enlarged sectional view taken on the line 11—11 of Figure 10.

The front apron 2 desirably may be either of the form shown in Figures 1, 2 and 7 or of the form shown in Figure 8. In the form shown in Figures 1, 2 and 7, the front apron is carried on a pipe 70 which has shafts 71 and 72 secured in the ends thereof. These shafts are mounted in bearings 73 and 74 that are secured on the top of the plate 19. The front apron is a curved steel plate reinforced by a series of ribs 75 that are welded to the plate. The width of the front apron is such that it fits snugly between the side plates 42 and 43 of the bowl. The front apron is operated by an hydraulic cylinder 76 which is pivotally secured to the front pedestal 7 and which has a piston rod 77 that is pivotally secured to the apron 2.

In the form of the front apron shown in Figure 8, the apron 2′ extends only part way up toward the top of the bowl 1. In this form of the invention I provide a plate 78 above the apron 2′ and between the side plates of the bowl 1. This plate 78 is secured to a tubular cross tie member 79 that is used in place of the member 22 of the main form of the invention to tie the sides of the main frame together. Straps 80 and 81 welded to the plate 78 and to the member 79 rigidly secure the plate 78 in position. The front apron 2′ is carried on a pipe 82 which is mounted in the same fashion as the pipe 70 but is secured to the under side of the side frames 14 and 15 by shafts 71′ and 72′ and suitable bearings 73′ and 74′. An arm 83 is secured to the pipe 82 midway between its ends and extends upwardly as illustrated in Figure 8. This arm is connected to a piston 84 of an hydraulic cylinder 85 which is pivoted at 86 to the front pedestal 7 of the machine. The apron 2′ is reinforced by ribs 75′.

The bowl itself is rocked on its pivots from loading or scraping position to transporting position and dumping position by a pair of hydraulic cylinders 87 and 88 and piston rods 89 and 90. The plates 42 and 43 have up standing ears 91 and 92 respectively to which the rods 89 and 90 are secured. The cylinders 87 and 88 are pivoted on brackets 93 and 94 that are provided on the plates 19 and brackets 95 and 96 that are provided on the cross tie pipe 24.

The bowl, front apron and tail gate assembly just described and the operating mechanisms for the bowl and the front apron and the tail gate are so arranged that the bowl itself is entirely open across the top with no framework or operating member to obstruct it in any way. The bowl may be loaded from the top or it may be used to scrape and load.

In operating the bowl as a scraper, the front apron is used in a novel fashion to work the material scraped up toward the back of the bowl. It is supplied with its own source of power (cylinder 76 and piston rod 77) to push the dirt through the front end of the bowl. This self-loading feature makes it unnecessary to provide the immense tractive effort required by previous scrapers to force the scraper bowl into the earth so that pressure of the dirt causes the scraper to fill. The front apron also serves as a front closure for the bowl when in transporting position.

With my improved tail gate construction, the machine can be used to spread materials whenever desired and to any depth required. Since the tail gate is carried entirely by the same stub shafts that carry the bowl and its movements are relative to the bowl, it can readily be seen that by setting the gate to dump, the load in the bowl can be spread evenly over a surface along which the machine is traveling. This is of particular advantage where a machine is being used to make a cut in a highway and a fill in a near by place. The material taken out of the cut can be spread evenly in the fill area so that no interference due to dumped loads will be encountered and the one machine will serve to excavate, transport, fill and level.

*Front pedestal and steering construction*

The front pedestal 7 as hereinbefore described, is joined by welding to the channels 16 and 17 and the plate 18. A pair of steel channels 97 and 98 extend from the pedestal 7 to the cross tie member 22 or in the form of the device shown in Figure 8, to the cross tie member 79. Beneath the channels 16 and 17, I also provide a plate 99 similar to the plate 19*a*. This plate is welded to the channels 16 and 17 and to the pedestal 7.

Figures 12, 13, 14:
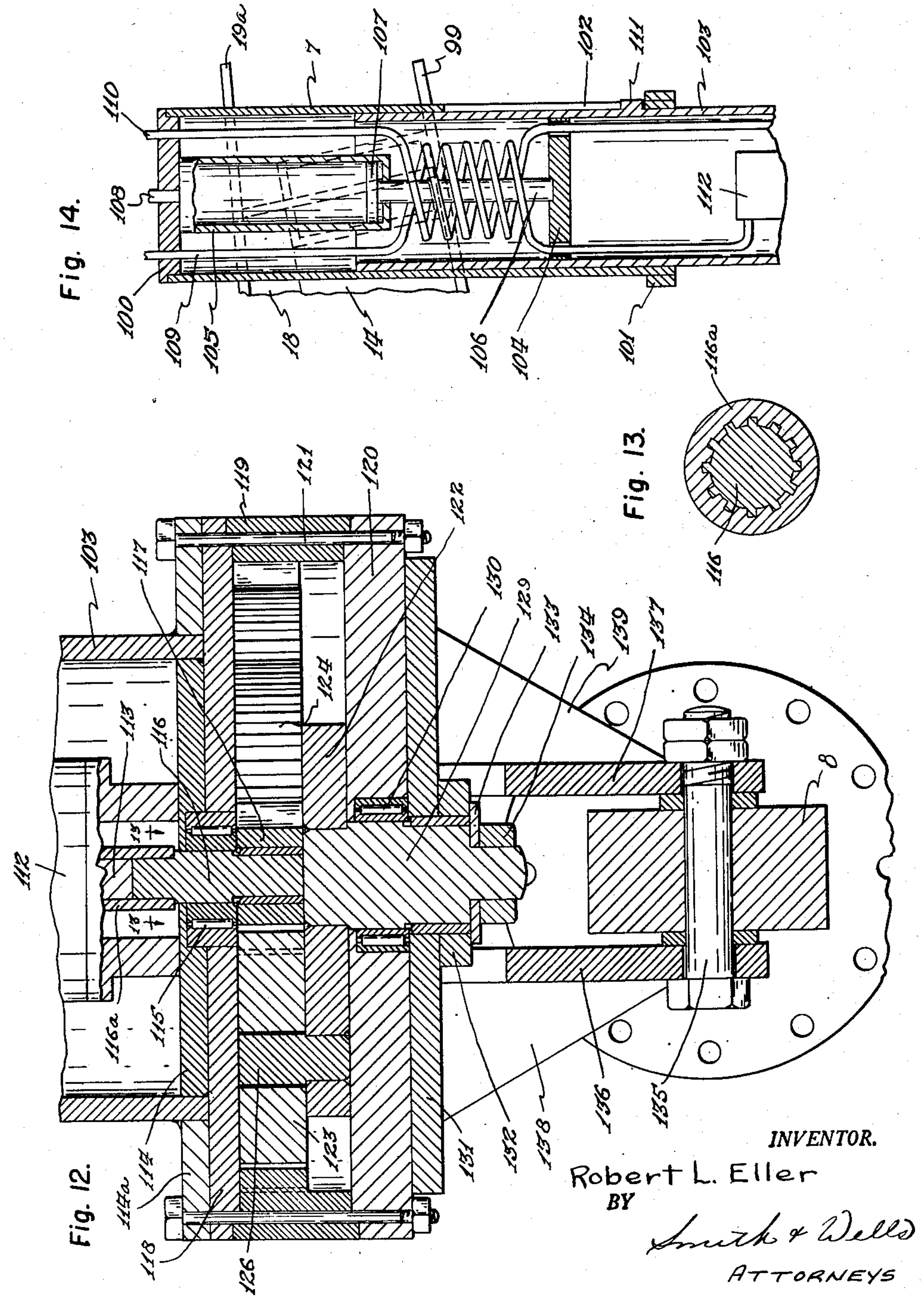
Figure 12 is a sectional view on the line 12—12 of Figure 10.
Figure 13 is a fragmentary sectional view taken on the line 13—13 of Figure 12.
Figure 14 is a sectional view on a reduced scale through the upper portion of the front pedestal.

The upper portion of the pedestal 7 is illustrated in section in Figure 14. The pedestal 7 is tubular with a head 100 closing the top thereof. The lower end of the pedestal is strengthened by a band 101. At the front the pedestal has a vertically running slot 102 therein. Inside the pedestal 7 is a second tubular member 103 which is movable vertically in the pedestal 7 to adjust the height of the front end of the framework with respect to the ground. The member 103 has a heavy plate 104 fixed therein intermediate its ends and this plate is adapted to support the weight of the pedestal 7 in any adjusted position. The hydraulic cylinder 105 is secured to the head 100 and a piston rod 106 has its piston 107 in the cylinder 105. The rod 106 is seated in the plate 104 as illustrated in Figure 14. Hydraulic fluid is fed to the cylinder 105 by a conduit 108. Two additional conduits 109 and 110 extend down through the head 100 to furnish hydraulic fluid to the steering mechanism described hereinafter. The conduits 109 and 110 are shown as coiled about the piston rod 106 to give the necessary flexibility for vertical adjustment between the pedestal 7 and the member 103. A lug 111 on the member 103 fits in the slot 102 of the pedestal 7 to prevent relative rotation between the member 103 and the pedestal 7.

The lower end of the member 103 carries a steering motor 112 to which the conduits 109 and 110 lead. The motor 112 is an hydraulic motor and has its drive shaft shown at 113 in Figure 12. Figures 10, 11, 12 and 13 are detailed views illustrating the steering mechanism which will now be described.

The bottom end of the member 103 is welded to and closed by a circular plate 114—114*a*, the inner portion 114 carries a roller bearing 115 for a steering shaft 116. The shaft 116 is connected to the shaft 113 by a sleeve 116*a* (see Figure 13). The shaft 116 has a pinion 117 keyed thereon at its lower end. The plate 114—114*a* is reinforced by a second plate 118 preferably welded thereto and these plates are supported upon an internal ring gear 119. The gear 119 is in turn supported in a bottom plate 120. Bolts 121 secure plates 114—114*a*, 118, the ring gear 119 and the plate 120 together into a single structure.

Inside the ring gear 119 I provide a planetary gear plate 122. The gear plate 122 mounts three gears 123, 124 and 125 on stub shafts 126, 127 and 128 respectively. These stub shafts are secured in the plate 122. The gears 123, 124 and 125 mesh with the pinion 117 so as to be rotated thereby whenever the shaft 116 is rotated by the motor 112.

The plate 122 has a shaft 129 fixed thereto and extending downwardly. The shaft 129 is axially aligned with the shaft 116. Roller bearings 130 are provided in the plate 120 for the shaft 129. The shaft 129 is keyed to a plate 131 which is reinforced by a disc 132. The assembly is held together by a washer 133 and a nut 134 on the lower end of the shaft 129. It is believed to be clear that rotation of the pinion 117 will communicate motion at a much slower rate through the planetary gear arrangement to the shaft 129 to rotate it and the plate 131 whenever the shaft 116 is rotated by the motor 112.

Figure 3:
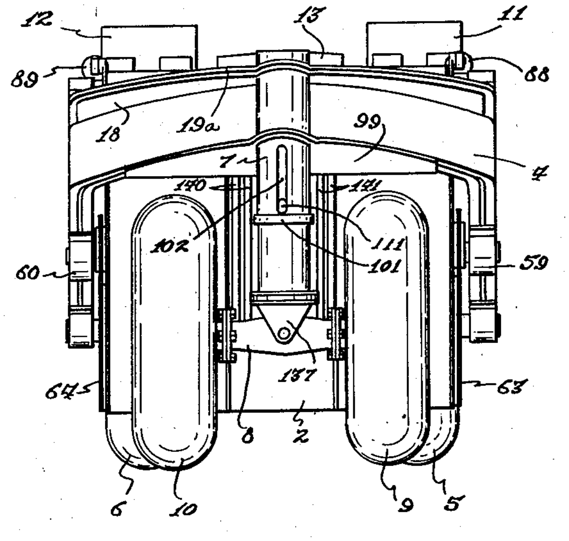
Figure 3 is a front end view of the machine.
Figure 4:
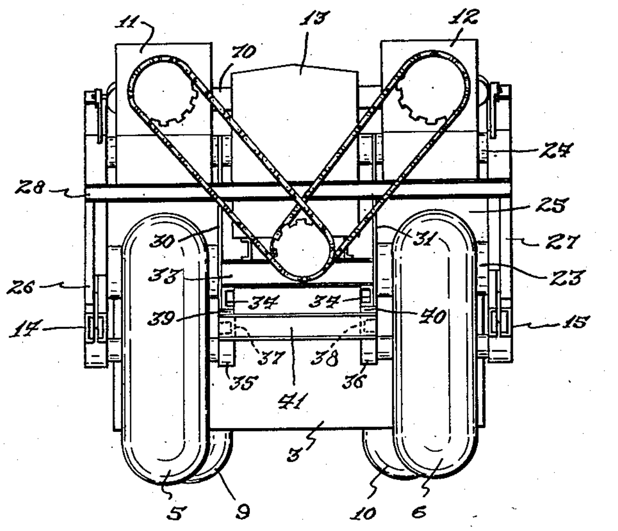
Figure 4 is a rear end view of the machine.
Figure 6:
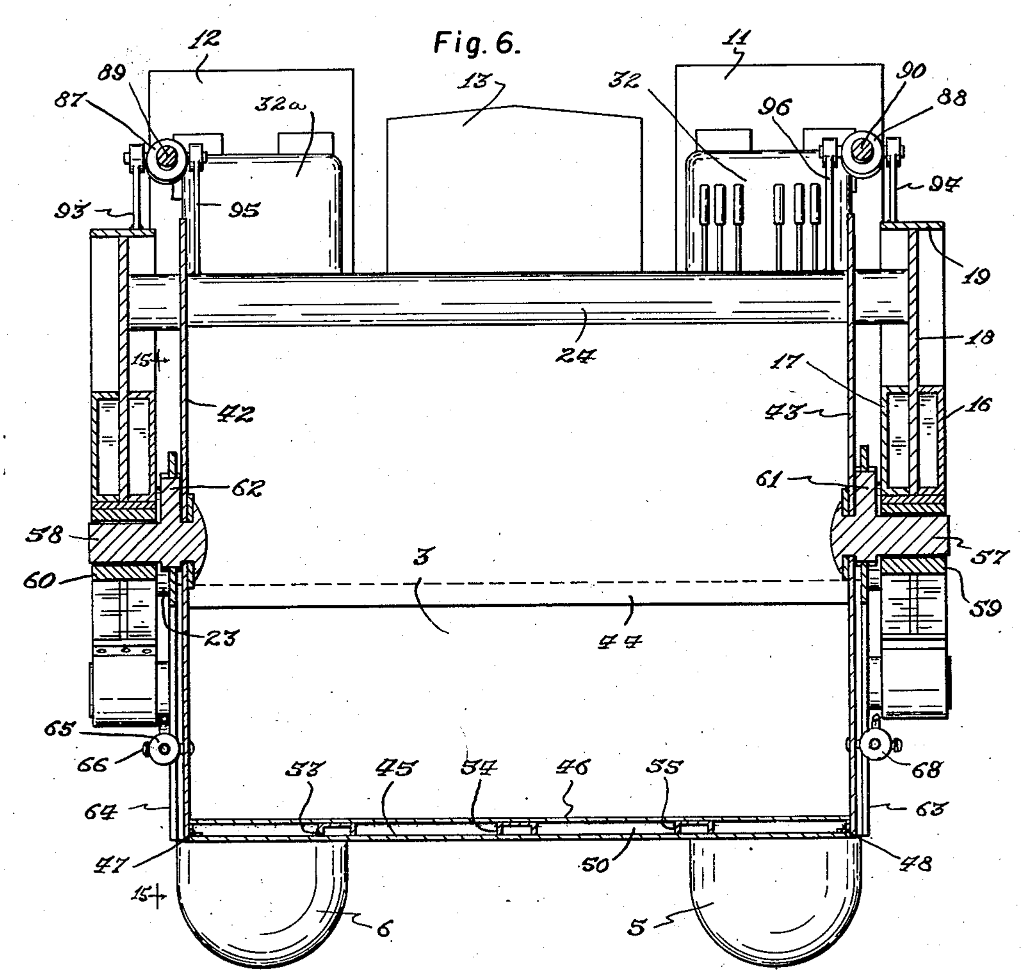
Figure 6 is an enlarged sectional view taken on the line 6—6 of Figure 2.

The wheels 9 and 10 as shown in Figure 3 are carried by the axle 8. The axle 8 is pivoted on a pivot pin 135 which is connected to the plate 131 by the two vertical members 136 and 137 of a saddle construction. The members 136 and 137 are suitably reinforced by webs 138 and 139, there being two of the webs 138 and two of the webs 139.

The steering mechanism just described is of such nature that the axle 8 may be turned by the shaft 129 through any amount of rotation desired. The pedestal 7 can be adjusted in height readily to control the level of the bowl 1 within the limits of adjustment provided. The entire steering assembly is enclosed within the lower member 103 of the pedestal and the parts 114, 119, and 120. Since each of the wheels has its own drive motor, provision must be made of course, for supplying hydraulic fluid under pressure to the wheels 9 and 10. The flexible conduits illustrated at 140 and 141 (see Figure 3) are provided for this purpose. These conduits extend upwardly from the wheels 9 and 10 and enter the spaces beneath the plates 19 inside the plates 18. The hydraulic conduits 108, 109 and 110 desirably are directed into the space between the plate 18 and the inner channel 16 back to the source of hydraulic fluid at the pumps 11 and 12.

Having thus described my invention, I claim:

Apparatus of the character described comprising a vehicle including a main frame having spaced apart side frame portions, a bowl having side walls pivoted to said side frame portions and a bottom wall connecting the lower ends of the side walls, the lower portions of the rear edges of the side walls being curved on a circular path about the pivotal axis of said side walls as a center, and a tail gate extending across the lower rear end of said bowl and having flanges overlapping the side walls and pivotally mounted thereon, the tail gate being curved to engage the curved rear edges of the side wall when its lower edge is aligned with the bottom wall, the bowl having stub shafts on its side walls mounted in bearings carried by said side frame portions, and having enlarged bearing portions at the bases of said stub shafts on which the tail gate flanges are pivoted, said bearing portions having their centers offset with respect to the center of the stub shaft thereby providing an eccentric mounting to cause the tail gate to move outwardly from the bowl as said gate is raised.

References Cited in the file of this patent

UNITED STATES PATENTS

| | | |
|---|---|---|
| 1,175,822 | Rowell | Mar. 14, 1916 |
| 1,870,673 | Detrick | Aug. 9, 1932 |
| 2,180,658 | Austin | Nov. 21, 1939 |
| 2,198,087 | Moore | Apr. 23, 1940 |
| 2,215,026 | Austin | Sept. 17, 1940 |
| 2,271,631 | Davidson | Feb. 3, 1942 |
| 2,272,221 | Mork | Feb. 10, 1942 |
| 2,272,540 | Austin | Feb. 10, 1942 |
| 2,291,858 | Allin | Aug. 4, 1942 |
| 2,308,534 | Paulsen | Jan. 19, 1943 |
| 2,380,285 | Austin | July 10, 1945 |
| 2,386,192 | Brimhall | Oct. 9, 1945 |
| 2,396,287 | Robb | Mar. 12, 1946 |
| 2,408,806 | Mork | Oct. 8, 1946 |
| 2,411,688 | Keim et al. | Nov. 26, 1946 |
| 2,418,813 | Anderson | Apr. 15, 1947 |
| 2,419,262 | Gurries et al. | Apr. 22, 1947 |
| 2,422,813 | Walch | June 24, 1947 |
| 2,554,698 | Evans | May 29, 1951 |
| 2,565,384 | Lindquist | Aug. 21, 1951 |

FOREIGN PATENTS

| | | |
|---|---|---|
| 119,871 | Australia | May 10, 1945 |